US012577147B2

(12) United States Patent
Zhang et al.

(10) Patent No.: US 12,577,147 B2
(45) Date of Patent: Mar. 17, 2026

(54) FLUORESCENT GLASS CERAMIC WITH HIGH TRANSPARENCY AND PREPARATION METHOD AND USE THEREOF

(71) Applicant: AIDITE (QINHUANGDAO) TECHNOLOGY CO., LTD., Qinhuangdao (CN)

(72) Inventors: Jiaxin Zhang, Qinhuangdao (CN); Quanyi Nie, Qinhuangdao (CN); Lijia Zhao, Qinhuangdao (CN); Yong Yu, Qinhuangdao (CN); Zhenyu Du, Qinhuangdao (CN); Jingjing Zheng, Qinhuangdao (CN)

(73) Assignee: AIDITE (QINHUANGDAO) TECHNOLOGY CO., LTD., Qinhuangdao (CN)

( * ) Notice: Subject to any disclaimer, the term of this patent is extended or adjusted under 35 U.S.C. 154(b) by 18 days.

(21) Appl. No.: 17/910,462

(22) PCT Filed: Jul. 8, 2022

(86) PCT No.: PCT/CN2022/104550
§ 371 (c)(1),
(2) Date: Sep. 9, 2022

(87) PCT Pub. No.: WO2023/071289
PCT Pub. Date: May 4, 2023

(65) Prior Publication Data
US 2024/0199471 A1 Jun. 20, 2024

(30) Foreign Application Priority Data

Oct. 28, 2021 (CN) .......................... 202111266277.5

(51) Int. Cl.
| | |
|---|---|
| *C03C 4/12* | (2006.01) |
| *C03B 19/06* | (2006.01) |
| *C03B 25/02* | (2006.01) |
| *C03B 32/02* | (2006.01) |
| *C03C 1/04* | (2006.01) |
| *C03C 10/00* | (2006.01) |
| *C09K 11/77* | (2006.01) |

(52) U.S. Cl.
CPC ................ *C03C 4/12* (2013.01); *C03B 19/06* (2013.01); *C03B 25/02* (2013.01); *C03B 32/02* (2013.01); *C03C 1/04* (2013.01); *C03C 10/00* (2013.01); *C09K 11/7766* (2013.01); *C03C 2204/00* (2013.01)

(58) Field of Classification Search
CPC .. C03C 4/12; C03C 1/04; C03C 10/00; C03C 2204/00; C09K 11/7766; C03B 19/06; C03B 32/02
See application file for complete search history.

(56) References Cited

U.S. PATENT DOCUMENTS

| | | | |
|---|---|---|---|
| 10,131,569 B2 | 11/2018 | Krolikowski et al. | |
| 2011/0009254 A1* | 1/2011 | Schweiger ............. | A61K 6/802 65/33.9 |
| 2017/0144919 A1* | 5/2017 | Krolikowski .......... | C09K 11/08 |

FOREIGN PATENT DOCUMENTS

| | | |
|---|---|---|
| CN | 106277798 A | 1/2017 |
| CN | 111792847 A | 10/2020 |
| CN | 113831016 A | 12/2021 |

OTHER PUBLICATIONS

The State Intellectual Property Office of People's Republic of China, First Office Action and Cited References for Application No. 202111266277.5 and English Translation, Oct. 28, 2022.
China National Intellectual Property Administration (ISA/CN), WIPO International Search Report, Written Opinion, and Cited References for PCT/CN2022/104550, Sep. 22, 2022.

* cited by examiner

*Primary Examiner* — C Melissa Koslow

(57) ABSTRACT

Provided are a fluorescent glass ceramic with high transparency and a preparation method and use thereof. The fluorescent glass ceramic includes the following raw materials by mass percentage: 63 wt % to 70 wt % of $SiO_2$, 13 wt % to 16 wt % of $Li_2O$, 1 wt % to 6 wt % of $Al_2O_3$, 1 wt % to 10 wt % of $K_2O$, 2 wt % to 6 wt % of $P_2O_5$, 0.5 wt % to 3.5 wt % of $CeO_2$, 0 wt % to 4 wt % of an additive, 1 wt % to 4 wt % of a lanthanide oxide with an atomic number of 59 to 71, and 0 wt % to 8 wt % of a colorant. The fluorescent glass ceramic has a lithium metasilicate crystal as a principal crystalline phase, and the lithium metasilicate crystal has a layered or plate-like structure and a grain size of 0.1 μm to 1.5 μm.

17 Claims, 2 Drawing Sheets

FLUORESCENT GLASS CERAMIC WITH HIGH TRANSPARENCY AND PREPARATION METHOD AND USE THEREOF

CROSS REFERENCE TO RELATED APPLICATION

The present application claims priority to the Chinese Patent Application No. 202111266277.5, entitled "Fluorescent glass ceramic with high transparency and preparation method and use thereof" filed on Oct. 28, 2021, the disclosure of which is incorporated herein by reference in its entirety.

TECHNICAL FIELD

The present disclosure belongs to the technical field of glass ceramics, and in particular relates to a fluorescent glass ceramic with high transparency and a preparation method and use thereof.

BACKGROUND ART

With the rapid rise and development of a chair-side computer aided design/computer aided manufacturing (CAD/CAM) restoration system, patients could recover immediately on the same day of the surgery, which brings a lot of convenience for prosthodontics and greatly saves time and costs. Due to advantages of excellent translucency, desirable mechanical properties and inherent characteristics of being easily etched by HF (hydrogen fluoride), lithium disilicate-based glass ceramics play an important role in the chair-side restoration system and rapidly become a preferred material for aesthetic restorations of anterior teeth.

However, due to having a crystal structure distributed in a state of three-dimensional interweaving and interlocking of grains, the lithium disilicate-based glass ceramics are difficult to process by diamond bur. Therefore, lithium metasilicate-based glass ceramics that are easy to process have been obtained through continuous exploration of researchers.

CN106277798A discloses a lithium metasilicate-based glass ceramic and a preparation method thereof. The method includes the following steps: (a) preparing a glass matrix liquid; (b) pouring the glass matrix liquid into a mold and cooling to obtain a glass matrix blank; and (c) placing the glass matrix blank in a heating device for heat treatment at 450° C. to 600° C. for 20 min to 150 min, with a heating rate of 5° C./min to 20° C./min. After the heat treatment is completed, a product is cooled with the furnace to obtain the lithium metasilicate-based glass ceramic. However, the lithium metasilicate-based glass ceramic obtained by the method has no fluorescent effect, making it difficult to achieve a truly differentiated product. The reason is that the lithium metasilicate-based glass ceramic is prepared by high-temperature melting, while rare earth elements with a fluorescent effect are easily-volatilized at high temperature above 1,400° C., and undergo valence change under oxidative conditions, such that it is difficult to excite desired fluorescence properties under a specific wavelength of ultraviolet light.

Therefore, in order to effectively avoid the valence change of rare earth elements under high temperature, U.S. Pat. No. 10,131,569B2 describes that the valence change of rare earth elements may be controlled by introducing a reducing agent or reducing atmosphere, thereby achieving the fluorescence properties of glass ceramics. However, due to disadvantages of being difficult to control the production process and high operating costs, it is difficult to achieve mass production.

In summary, it has become a technical problem to be solved urgently to adopt a method with a simple process, a low cost, and mass production for preparing a glass ceramic with a fluorescent effect, a high transparency, and extremely easy processing properties.

SUMMARY

The present disclosure is to provide a fluorescent glass ceramic with high transparency and a preparation method and use thereof. The fluorescent glass ceramic forms a lithium metasilicate-based glass ceramic with a fluorescent effect, high transparency, and extremely easy processing properties by optimizing a ratio. In the preparation method, conventional melting casting or vacuum sintering is adopted, without special control of reducing atmosphere or introduction of a reducing agent, which greatly optimizes processability and transparency of the lithium metasilicate-based glass ceramic, and enables the glass ceramic to show excellent fluorescence properties under ultraviolet light.

In order to achieve the above objects, the present disclosure provides the following technical solutions:

In a first aspect, the present disclosure provides a fluorescent glass ceramic with high transparency, including the following raw materials by mass percentage: 63 wt % to 70 wt % of $SiO_2$, such as 63 wt %, 65 wt %, 67 wt %, or 70 wt %; 13 wt % to 16 wt % of $Li_2O$, such as 13 wt %, 14 wt %, 15 wt %, or 16 wt %; 1 wt % to 6 wt % of $Al_2O_3$, such as 1 wt %, 2 wt %, 3 wt %, 4 wt %, 5 wt %, or 6 wt %; 1 wt % to 10 wt % of $K_2O$, such as 1 wt %, 3 wt %, 5 wt %, 7 wt %, or 10 wt %; 2 wt % to 6 wt % of $P_2O_5$, such as 2 wt %, 3 wt %, 4 wt %, 5 wt %, or 6 wt %; 0.5 wt % to 3.5 wt % of $CeO_2$, such as 0.5 wt %, 1 wt %, 1.5 wt %, 2 wt %, 2.5 wt %, or 3.5 wt %; 0 wt % to 4 wt % of an additive, such as 0 wt %, 1 wt %, 2 wt %, 3 wt %, or 4 wt %; 1 wt % to 4 wt % of a lanthanide oxide with an atomic number of 59 to 71, such as 1 wt %, 2 wt %, 3 wt %, or 4 wt %; and 0 wt % to 8 wt % of a colorant, such as 0 wt %, 2 wt %, 4 wt %, 5 wt %, or 8 wt %. However, it is not limited to the above stated values, and other unrecited values within the numerical range are also applicable.

In some embodiments, the fluorescent glass ceramic has a lithium metasilicate crystal as a principal crystalline phase;

the lithium metasilicate crystal has a layered or plate-like structure; and the lithium metasilicate crystal has a grain size of 0.1 μm to 1.5 μm, such as 0.1 μm, 0.3 μm, 0.5 μm, 0.7 μm, 0.9 μm, 1.1 μm, 1.3 μm, or 1.5 μm. However, it is not limited to the above stated values, and other unrecited values within the numerical range are also applicable.

In the present disclosure, by optimizing of a composition ratio of the raw materials of the fluorescent glass ceramic, it is possible to obtain a lithium metasilicate-based glass ceramic with a fluorescent effect, high transparency, and extremely easy processing properties, which is beneficial to mass production.

In the present disclosure, the glass ceramic has excellent fluorescence properties under ultraviolet light. The main reason is that a proportion of $Ce^{4+}$ ions in the glass matrix that are partially or completely converted into $Ce^{3+}$ ions can be well controlled; the formed $Ce^{3+}$ ions are prone to an interaction between electric dipoles of 4f to 5d, making the lithium metasilicate-based glass ceramic show excellent fluorescence properties. However, in the prior art, the raw materials of the glass ceramic generally include pentavalent/ hexavalent metal oxides (namely $Me^V_2O_5$ or $Me^{VI}O_3$), and $Me^{5+}/Me^{6+}$ ions are easily reduced to $Me^{4+}$ ions and/or $Me^{3+}$ ions during heat treatment, resulting in the conversion of $Ce^{3+}$ ions into $Ce^{4+}$ ions, and excess $Ce^{4+}$ may damage the fluorescence effect of the glass ceramic.

In the present disclosure, by optimizing the composition and ratio of raw materials, the above problem is well solved, a color tone effect is ensured and an influence of further oxidation of $Ce^{3+}$ ions in the glass ceramic is avoided, ensuring a desirable fluorescence effect. The lanthanide oxide with the atomic number of 59 to 71 could assist in toning of the glass ceramic.

In the present disclosure, the lithium metasilicate-based glass ceramic is extremely easy to process. The reason mainly includes: 1) the layered or plate-like crystal has a desirable dissociation surface, which is easily ground by a bur during the processing without chipping; and 2) there is a large number of crystals distributed in a unit volume, which further increases an interface between the glass matrix and the crystal to improve processing performance.

The following are some embodiments of the present disclosure, but not as limitation of the technical solutions provided by the present disclosure. Through the following embodiments, the technical purpose and beneficial effects of the present disclosure could be better achieved.

In some embodiments, the fluorescent glass ceramic includes the following raw materials by mass percentage: 64 wt % to 66 wt % of $SiO_2$, such as 64 wt %, 65 wt %, or 66 wt %; 14 wt % to 15 wt % of $Li_2O$, such as 14 wt %, 14.5 wt %, or 15 wt %; 2 wt % to 4 wt % of $Al_2O_3$, such as 2 wt %, 3 wt %, or 4 wt %; 2 wt % to 5 wt % of $K_2O$, such as 2 wt %, 3 wt %, 4 wt %, or 5wt %; 3 wt % to 4 wt % of $P_2O_5$, such as 3 wt %, 3.5 wt %, or 4 wt %; 1.5 wt % to 3.0 wt % of $CeO_2$, such as 1.5 wt %, 2.0 wt %, 2.5 wt %, or 3.0 wt %; 1 wt % to 3 wt % of the additive, such as 1 wt %, 2 wt %, or 3 wt %; 1.5 wt % to 3.0 wt % of the lanthanide oxide with an atomic number of 59 to 71, such as 1.5 wt %, 2 wt %, 2.5 wt %, or 3.0 wt %; and 1 wt % to 4 wt % of the colorant, such as 1 wt %, 2 wt %, 3 wt %, or 4 wt %. However, it is not limited to the above stated values, and other unrecited values within the numerical range are also applicable.

In some embodiments, the additive includes at least one selected from the group consisting of a monovalent metal oxide and a divalent metal oxide.

In some embodiments, the monovalent metal oxide includes any one or a combination of two or more selected from the group consisting of $Na_2O$, $Rb_2O$, and $Cs_2O$; typical but non-limiting examples of the combination include: a combination of $Na_2O$ and $Cs_2O$, a combination of $Na_2O$ and $Rb_2O$, and a combination of $Na_2O$, $Rb_2O$, and $Cs_2O$.

In some embodiments, the divalent metal oxide includes any one or a combination of two or more selected from the group consisting of MgO, SrO, ZnO, and CaO; typical but non-limiting examples of the combination include: a combination of MgO and CaO, a combination of MgO, SrO and ZnO, and a combination of SrO, ZnO, and CaO.

In some embodiments, the lanthanide oxide with an atomic number of 59 to 71 includes any one or a combination of two or more selected from the group consisting of $Nd_2O_3$, $Th_2O_3$, $Pr_6O_{11}$, $Eu_2O_3$, and $Er_2O_3$; typical but non-limiting examples of the combination include: a combination of $Nd_2O_3$ and $Tb_2O_3$, a combination of $Nd_2O_3$, $Pr_6O_{11}$, and $Eu_2O_3$, and a combination of $Eu_2O_3$ and $Er_2O_3$.

In some embodiments, the colorant includes any one or a combination of two or more selected from the group consisting of $TiO_2$, CuO, MnO, and $SeO_2$; typical but non-limiting examples of the combination include: a combination of $TiO_2$ and CuO, a combination of $TiO_2$, CuO, and MnO, and a combination of CuO, MnO, and $SeO_2$.

In some embodiments, a 1-mm-thick sample of the fluorescent glass ceramic has an optical transmittance of 40% to 90% at 550 nm, such as 40%, 45%, 50%, 55%, 60%, 65%, 70%, 75% %, 80%, 85%, or 90%. However, it is not limited to the above stated values, and other unrecited values within the numerical range are also applicable.

In the present disclosure, the glass matrix in the glass ceramic has a relatively large content, and the lithium metasilicate crystal has a content much smaller than that of the glass matrix, making the glass ceramic have higher transmittance; in addition, the lithium metasilicate crystal has a refractive factor (1.57) close to that (1.60) of the glass matrix, with a difference of only 0.03, which greatly reduces a light scattering effect, thereby effectively improving the transmittance of the glass ceramic.

In a second aspect, the present disclosure provides a method for preparing the fluorescent glass ceramic as described above, including the following steps:

(1) mixing the raw materials of the fluorescent glass ceramic according to a proportion to obtain a mixture, and subjecting the mixture to primary melting and water quenching in sequence to obtain a glass slag;

(2) subjecting the glass slag obtained in step (1) to secondary melting and a forming annealing treatment in sequence to obtain a first glass matrix; or subjecting the glass slag obtained in step (1) to grinding, dry pressing, and vacuum sintering in sequence to obtain a second glass matrix; and (3) subjecting the first glass matrix or the second glass matrix obtained in step (2) to a first heat treatment and a second heat treatment in sequence to obtain the fluorescent glass ceramic with high transparency.

In the present disclosure, in the preparation method conventional melting casting or vacuum sintering is adopted; by optimizing a formulation composition and a heat treatment process, a valence state balance of rare earth elements could be stably maintained at a high temperature without controlling reducing atmosphere or introducing a reducing agent, greatly improving the processability, high transparency, and fluorescence properties under ultraviolet light of the lithium metasilicate-based glass ceramic, while reducing the process difficulty.

In some embodiments of the present disclosure, the glass matrix is subjected to the first heat treatment to form a large number of crystal nucleus, and then to the second heat treatment, so as to produce the fluorescent glass ceramic with high transparency and having lithium metasilicate as a principal crystalline phase.

In some embodiments, in step (1), the primary melting is conducted at 1,300° C. to 1,600° C., such as 1,300° C., 1,350° C., 1,400° C., 1,450° C., 1,500° C., 1,550° C., or 1,600° C. However, it is not limited to the above stated values, and other unrecited values within the numerical range are also applicable.

In some embodiments, in step (1), the primary melting is conducted for 1 h to 6 h, such as 1 h, 2 h, 3 h, 4 h, 5 h, or 6 h. However, it is not limited to the above stated values, and other unrecited values within the numerical range are also applicable.

In some embodiments, in step (2), the secondary melting is conducted at 1,300° C. to 1,600° C., such as 1,300° C., 1,350° C., 1,400° C., 1,450° C., 1,500° C., 1,550° C., or 1,600° C. However, it is not limited to the above stated values, and other unrecited values within the numerical range are also applicable In some embodiments, in step (2), the secondary melting is conducted for 1 h to 6 h, such as 1 h, 2 h, 3 h, 4 h, 5 h, or 6 h. However, it is not limited to the above stated values, and other unrecited values within the numerical range are also applicable.

In some embodiments, in step (2), the forming annealing treatment includes: pouring a base glass liquid obtained after the secondary melting into a first mold and subjecting the base glass liquid to annealing to obtain the first glass matrix.

In some embodiments, the first mold is preheated at 200° C. to 500° C., such as 200° C., 250° C., 300° C., 350° C., 400° C., 450° C., or 500° C. However, it is not limited to the above stated values, and other unrecited values within the numerical range are also applicable.

In some embodiments, the annealing is conducted for 0.5 h to 24 h, such as 0.5 h, 2 h, 4 h, 8 h, 12 h, 16 h, 20 h, 22 h, or 24 h. However, it is not limited to the above stated values, and other unrecited values within the numerical range are also applicable.

In some embodiments, the first glass matrix is cooled to ambient temperature after the forming annealing treatment.

In some embodiments, in step (2), a glass powder with a particle size of 0.2 $\mu$m to 50 $\mu$m is obtained after the grinding, such as 0.2 $\mu$m, 5 $\mu$m, 10 $\mu$m, 20 $\mu$m, 30 $\mu$m, 40 $\mu$m or 50 $\mu$m. However, it is not limited to the above stated values, and other unrecited values within the numerical range are also applicable.

In some embodiments, in step (2), the dry pressing includes: subjecting the glass powder obtained after the grinding to dry pressing in a second mold to obtain a biscuit.

In some embodiments, in step (2), the dry pressing is conducted at 5 MPa to 50 MPa, such as 5 MPa, 10 MPa, 20 MPa, 30 MPa, 40 MPa, or 50 MPa. However, it is not limited to the above stated values, and other unrecited values within the numerical range are also applicable.

In some embodiments, in step (2), the vacuum sintering is conducted at a vacuum degree of 100 Pa to 3,000 Pa, such as 100 Pa, 300 Pa, 500 Pa, 700 Pa, 800 Pa, 1,000 Pa, 1,500 Pa, 2,000 Pa, or 3,000 Pa. However, it is not limited to the above stated values, and other unrecited values within the numerical range are also applicable.

In some embodiments, in step (2), the vacuum sintering is conducted at 900° C. to 1,200° C., such as 900° C., 1,000° C., 1,100° C., or 1,200° C. However, it is not limited to the above stated values, and other unrecited values within the numerical range are also applicable.

In some embodiments, in step (2), the vacuum sintering is conducted for 100 min to 240 min, such as 100 min, 150 min, 180 min, 200 min, 210 min, 230 min, or 240 min. However, it is not limited to the above stated values, and other unrecited values within the numerical range are also applicable.

In some embodiments, in step (3), the first heat treatment is conducted at 450° C. to 580° C., such as 450° C., 480° C., 500° C., 520° C., 540° C., 560° C., 570° C., or 580° C. However, it is not limited to the above stated values, and other unrecited values within the numerical range are also applicable.

In some embodiments, in step (3), the first heat treatment is conducted for 1 h to 48 h, such as 1 h, 5 h, 10 h, 15 h, 20 h, 25 h, 30 h, 35 h, 40 h, or 48 h. However, it is not limited to the above stated values, and other unrecited values within the numerical range are also applicable.

In some embodiments, in step (3), the second heat treatment is conducted at 600° C. to 700° C., such as 600° C., 620° C., 640° C., 660° C., 680° C., or 700° C. However, it is not limited to the above stated values, and other unrecited values within the numerical range are also applicable.

In some embodiments, in step (3), the second heat treatment is conducted for 10 min to 240 min, such as 10 min, 30 min, 60 min, 120 min, 180 min, 200 min, or 240 min. However, it is not limited to the above stated values, and other unrecited values within the numerical range are also applicable.

Compared with the prior art, the embodiments of the present disclosure have the following beneficial effects:

In the present disclosure, the fluorescent glass ceramic does not include pentavalent/hexavalent metal oxides; by optimizing a composition ratio and optimizing a heat treatment process during the preparation process, the lithium metasilicate-based glass ceramic achieves greatly improved processability, high transparency, and fluorescence properties, and has a transmittance of not less than 64.65% at a wavelength of 550 nm.

DETAILED DESCRIPTION OF THE EMBODIMENTS

In order to better illustrate the present disclosure and facilitate understanding of the technical solutions of the present disclosure, the present disclosure will be further described in detail below. However, the following examples are only simple examples of the present disclosure, and do not represent or limit the protection scope of the present disclosure. The protection scope of the present disclosure is subject to the claims.

The raw materials of the fluorescent glass ceramics prepared in the following examples are shown in Table 1, where the content of each component is in mass percentage.

TABLE 1

| Raw material formulations of Examples 1 to 4 | | | | |
|---|---|---|---|---|
| Examples No. | Example 1 | Example 2 | Example 3 | Example 4 |
| $SiO_2$ | 65 | 66 | 64 | 65 |
| $Li_2O$ | 14.6 | 15.6 | 14.4 | 15.5 |
| $K_2O$ | 3.6 | 3.8 | 4.2 | 4.7 |
| $Al_2O_3$ | 3.8 | 3.6 | 3.8 | 3.0 |
| $P_2O_5$ | 3.5 | 3.8 | 3.8 | 3.4 |
| $CeO_2$ | 2.8 | 3.2 | 2.8 | 2.8 |
| SrO | 1.6 | 1.8 | 2.0 | 1.0 |
| MgO | 1.4 | 1.0 | 1.6 | 1.5 |
| $TiO_2$ | 2.05 | 1.2 | 1.8 | 1.8 |
| MnO | 1.65 | — | 1.6 | 1.3 |

The following are typical but non-limiting examples of the present disclosure:

Example 1

In this example, a method for preparing a fluorescent glass ceramic with high transparency was provided, where raw materials of the fluorescent glass ceramic were shown in Table 1.

The method for preparing the fluorescent glass ceramic was conducted as follows:

(1) Raw materials of the fluorescent glass ceramic were mixed evenly according to the proportion, and a resulting mixed material was placed in a crucible and then subjected to primary melting at 1,450° C. for 6 h, such that the raw materials were evenly distributed and the bubbles were escaped completely. The resulting melted material was subjected to water quenching to obtain a glass slag.

(2) The glass slag obtained in step (1) was placed in the crucible and then subjected to secondary melting at 1,450° C. for 6 h to obtain a glass liquid.

The glass liquid was poured into a first mold at 350° C. for molding, annealed for 1.5 h, and then naturally cooled to ambient temperature to obtain a first glass matrix.

(3) The first glass matrix obtained in step (2) was heated at 500° C. for 90 min, and then at 660° C. for 120 min to obtain the fluorescent glass ceramic with high transparency.

The fluorescent glass ceramic obtained in this example was characterized. The ceramic has a fluorescence spectrum shown in FIG. 1, a microscopic topography shown in FIG. 2, an XRD pattern shown in FIG. 3, and a transmittance curve at visible light ranging from 370 nm to 900 nm shown in FIG. 4.

Figure 1:
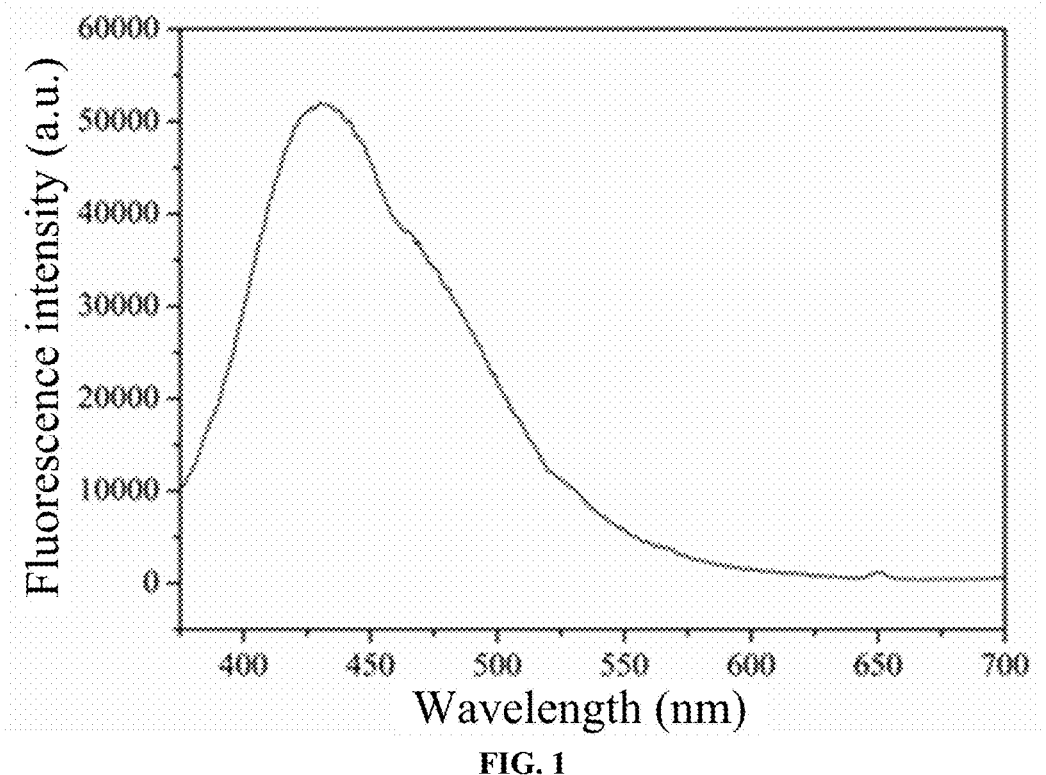
FIG. 1 is a diagram showing fluorescence spectrum of the fluorescent glass ceramic obtained in Example 1 of the present disclosure.

It can be seen from FIG. 1 that under an excitation wavelength of 366 nm, an emission spectrum shows a maximum width value at 430 nm. It is mainly attributed to the fact that $Ce^{3+}$ ions are prone to the interaction of 4f to 5d electric dipoles, and the fluorescence displayed could be perceived as a blue-white fluorescence as a whole by human eyes.

Figure 2:
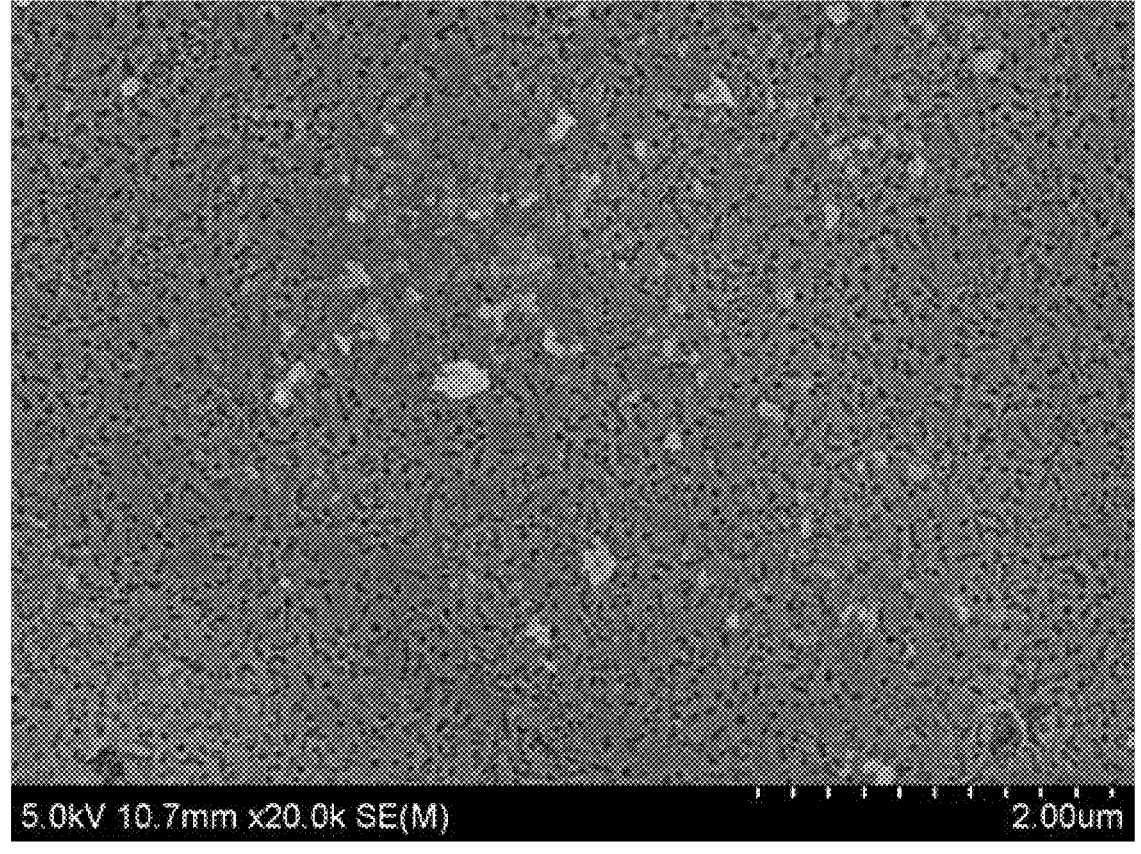
FIG. 2 shows the microscopic topography (by scanning electron microscope, SEM) of the fluorescent glass ceramic obtained in Example 1 of the present disclosure.

It can be seen from FIG. 2 that the sample has a plate-like microscopic morphology.

Figure 3:
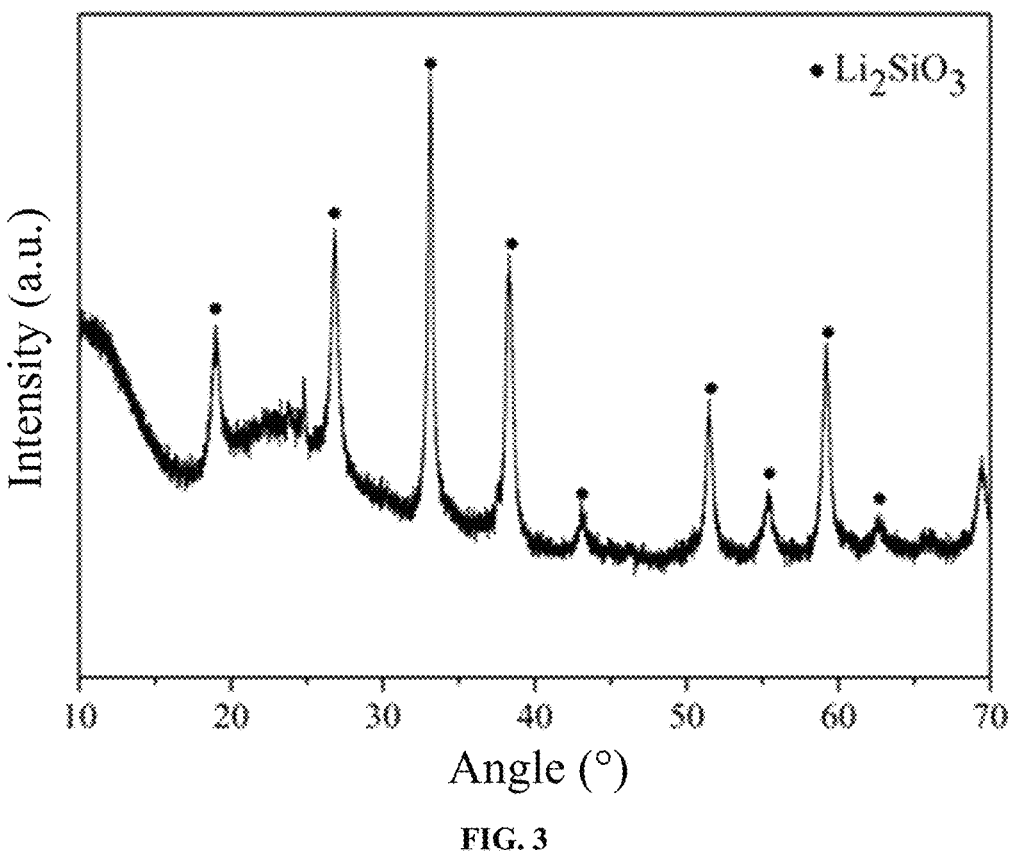
FIG. 3 shows an X-ray diffraction (XRD) pattern of the fluorescent glass ceramic obtain in Example 1 of the present disclosure.

It can be seen from FIG. 3 that the product has lithium metasilicate ($Li_2SiO_3$) as a principal crystalline phase.

Figure 4:
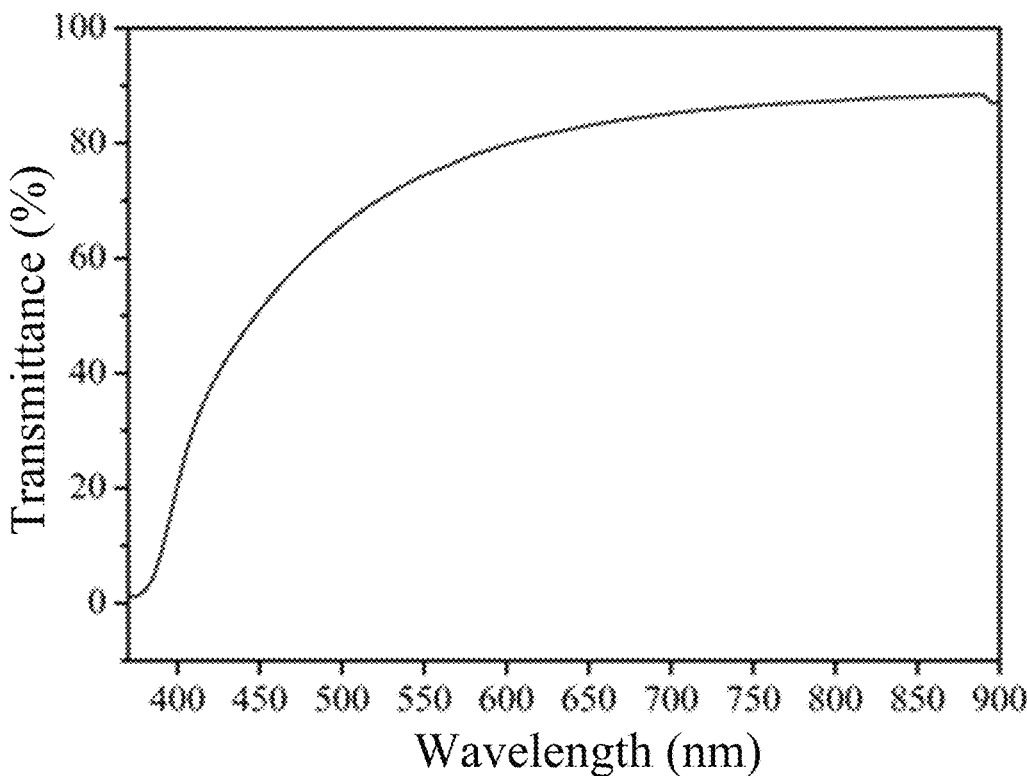
FIG. 4 shows a transmittance curve of the fluorescent glass ceramic obtained in Example 1 of the present disclosure at a visible light ranging from 370 nm to 900 nm.

It can be seen from FIG. 4 that a 1-mm-thick sample of the lithium metasilicate-based glass ceramic has an optical transmittance of 74.43% at 550 nm.

Example 2

In this example, a method for preparing a fluorescent glass ceramic with high transparency was provided, where raw materials of the fluorescent glass ceramic were shown in Table 1.

The method for preparing the fluorescent glass ceramic was conducted as follows:

(1) Raw materials of the fluorescent glass ceramic were mixed evenly according to the proportion, and a resulting mixed material was placed in a crucible and then subjected to primary melting at 1,550° C. for 3 h, such that the raw materials were evenly distributed and the bubbles were escaped completely. The resulting melted material was subjected to water quenching to obtain a glass slag.

(2) The glass slag obtained in step (1) was ground into a glass powder with a particle size of 20 µm, placed in a second mold and subjected to dry pressing at 10 MPa to obtain a biscuit. The biscuit was further placed in a vacuum sintering furnace and then subjected to sintering at a vacuum degree of 2,000 Pa and 1,100° C. for 120 min to obtain a second glass matrix.

(3) The second glass matrix obtained in step (2) was heated at 530° C. for 100 min, and then at 640° C. for 140 min to obtain the fluorescent glass ceramic with high transparency.

Example 3

In this example, a method for preparing a fluorescent glass ceramic with high transparency was provided, where raw materials of the fluorescent glass ceramic were shown in Table 1.

The method for preparing the fluorescent glass ceramic was conducted as follows:

(1) Raw materials of the fluorescent glass ceramic were mixed evenly according to the proportion, and a resulting mixed material was placed in a crucible and then subjected to primary melting at 1,550° C. for 4 h, such that the raw materials were evenly distributed and the bubbles were escaped completely. The resulting melted material was subjected to water quenching to obtain a glass slag.

(2) The glass slag obtained in step (1) was placed in the crucible and then subjected to secondary melting at 1,550° C. for 4 h to obtain a glass liquid.

The glass liquid was poured into a first mold at 350° C. for molding, annealed for 2 h, and then naturally cooled to ambient temperature to obtain a first glass matrix.

(3) The first glass matrix obtained in step (2) was heated at 570° C. for 150 min, and then at 650° C. for 120 min to obtain the fluorescent glass ceramic with high transparency.

Example 4

In this example, a method for preparing a fluorescent glass ceramic with high transparency was provided, where raw materials of the fluorescent glass ceramic were shown in Table 1.

The method for preparing the fluorescent glass ceramic was conducted as follows:

(1) Raw materials of the fluorescent glass ceramic were mixed evenly according to the proportion, and a resulting mixed material was placed in a crucible and then subjected to primary melting at 1,550° C. for 5 h, such that the raw materials were evenly distributed and the bubbles were escaped completely. The resulting melted material was subjected to water quenching to obtain a glass slag.

(2) The glass slag obtained in step (1) was ground into a glass powder with a particle size of 40 µm, placed in a second mold and subjected to dry pressing at 25 MPa to obtain a biscuit. The biscuit was further placed in a vacuum sintering furnace and then subjected to sintering at a vacuum degree of 2,400 Pa and 1,150° C. for 160 min to obtain a second glass matrix.

(3) The second glass matrix obtained in step (2) was heated at 560° C. for 160 min, and then at 630° C. for 150 min to obtain the fluorescent glass ceramic with high transparency.

Example 5

Example 6

In this example, a method for preparing a glass ceramic was provided, where raw materials of the glass ceramic are the same as those of the fluorescent glass ceramic in Example 1.

The method was conducted as described in Example 1, except that: in step (3), only a first heat treatment was conducted without a second heat treatment.

In this example, a method for preparing a glass ceramic was provided, where raw materials of the glass ceramic are the same as those of the fluorescent glass ceramic in Example 1.

The method was conducted as described in Example 1, except that: in step (3), the second heat treatment was conducted at 750° C.

Phase analysis was conducted on the glass ceramics obtained in Examples 1 to 6 and processing properties thereof were tested. The results are shown in Table 2.

| Table 2 Processability data of the glass ceramics prepared in Examples 1 to 6 | | | | | | |
|---|---|---|---|---|---|---|
| | Example 1 | Example 2 | Example 3 | Example 4 | Example 5 | Example 6 |
| $T_1$ (° C.) | 500 | 530 | 570 | 560 | 500 | 500 |
| $t_1$ (min) | 90 | 100 | 150 | 160 | 90 | 90 |
| $T_2$ (° C.) | 660 | 640 | 650 | 630 | — | 750 |
| $t_2$ (min) | 120 | 140 | 120 | 150 | — | 120 |
| Crystal phase after crystallization | $Li_2SiO_3$ | $Li_2SiO_3$ A small amount of $Li_2Si_2O_5$ | $Li_2SiO_3$ | $Li_2SiO_3$ | $Li_2SiO_3$ | $Li_2Si_2O_5$ |
| Crystal form | Plate-like | Plate-like | Layered | Layered | Layered | Bar-shaped |
| Processibility | No chipping | Minor chipping | No chipping | No chipping | Chipping | Severe chipping |

$T_1$ and $t_1$ are the temperature and time of the first heat treatment, respectively; and $T_2$ and $t_2$ are the temperature and time of the second heat treatment, respectively.

Three-point bending strength, hardness, grain size after crystallization, transmittance at 550 nm, and fluorescence properties of the glass ceramics obtained in Examples 1 to 6 were each determined according to the following methods. The results are shown in Table 3.

(1) Three-point bending strength: according to international standard ISO6872:2008, 15 samples were tested, and an average value of obtained three-point bending strength values was calculated.

(2) Vickers hardness: according to international standard ISO14705:2008, 15 sets of data were tested using a Vickers hardness tester to apply a load of 1 kilogram force (1 kgf), and then calculated to obtain an average value of the Vickers hardness of the samples.

(3) Transmittance: a test sample was tested at a wavelength of 370 nm to 900 nm using a spectrophotometer, where the test sample had a thickness of 1 mm.

(4) Fluorescence properties: the glass ceramics each were cut into a size of 13 mm×15 mm×2 mm, and then tested at an excitation wavelength of 366 nm, and a scanning range of 375 nm to 700 nm.

TABLE 3

| Performance data of the glass ceramics prepared in Examples 1 to 6 | | | | | | |
|---|---|---|---|---|---|---|
| | Example 1 | Example 2 | Example 3 | Example 4 | Example 5 | Example 6 |
| Three-point bending strength (MPa) | 127 | 115 | 130 | 126 | 95 | 200 |
| Hardness (GPa) | 5.70 | 5.90 | 5.50 | 5.40 | 5.40 | 5.50 |
| Grain size after crystallization (μm) | 0.6 | 0.8 | 1.0 | 0.5 | 0.4 | 1.2 |
| Transmittance (%, at 550 nm) | 74.43 | 70.12 | 64.65 | 84.23 | 86.43 | 38 |
| Fluorescent glass ceramic | Blue-white | Blue | Strong blue-white | Blue-white | Weak blue-white | Weak blue-white |

As can be seen from Example 1 in Tables 2 and 3, since a large number of plate-like lithium metasilicate crystals are distributed in the glass matrix, the prepared glass ceramic is extremely easy to process and has no chipping. The high glass phase content and the similar refractive index also enable the prepared glass ceramic with a transmittance of up to 74.43% at the wavelength of 550 nm. In addition, the ceramic exhibits a three-point bending strength of 127 MPa and a hardness of 5.70 GPa, providing a guarantee for subsequent processing and grinding. Moreover, the glass ceramic could display a blue-white fluorescence effect under ultraviolet light, showing excellent aesthetic properties.

As can be seen from Example 2 in Tables 2 and 3, since a large number of plate-like lithium metasilicate crystals are distributed in the glass matrix, the prepared glass ceramic is extremely easy to process and has only minor chipping. The prepared glass ceramic has a transmittance of up to 70.12% at the wavelength of 550 nm. In addition, the ceramic exhibits a three-point bending strength of 115 MPa and a hardness of 5.90 GPa. Moreover, the glass ceramic could display a blue fluorescence effect under ultraviolet light, showing excellent aesthetic properties.

As can be seen from Example 3 in Tables 2 and 3, since a large number of layered lithium metasilicate crystals are distributed in the glass matrix, the prepared glass ceramic is extremely easy to process and has no chipping. The high glass phase content and the similar refractive index also enable the prepared glass ceramic with a transmittance of up to 64.65% at the wavelength of 550 nm. In addition, the ceramic exhibits a three-point bending strength of 130 MPa and a hardness of 5.50 GPa, providing a guarantee for subsequent processing and grinding. Moreover, the glass ceramic could display a strong blue-white fluorescence effect under ultraviolet light, showing excellent aesthetic properties.

As can be seen from Example 4 in Tables 2 and 3, since a large number of layered lithium metasilicate crystals are distributed in the glass matrix, the prepared glass ceramic is extremely easy to process and has only minor chipping. The prepared glass ceramic has a transmittance of up to 84.23% at the wavelength of 550 nm. In addition, the ceramic exhibits a three-point bending strength of 126 MPa and a hardness of 5.40 GPa. Moreover, the glass ceramic could display a blue-white fluorescence effect under ultraviolet light, showing excellent aesthetic properties.

As can be seen from Example 5 in Table 2 and Table 3, since only the first heat treatment is conducted without the second heat treatment, the three-point bending strength is 95 MPa, the grain size after crystallization is 0.4 $\mu$m, and the transmittance is as high as 86.43%. Moreover, the glass ceramic could display a weak blue-white fluorescence effect under ultraviolet light, which is difficult to show excellent aesthetic properties.

As can be seen from Example 6 in Table 2 and Table 3, due to an increased temperature of the second heat treatment, the three-point bending strength is 200 MPa, the grain size after crystallization is 1.2 $\mu$m, and the transmittance is reduced to 38%. In addition, the higher second heat treatment temperature also tends to allow the $Li_2SiO_3$ crystal to continue growing to form a bar-shaped $Li_2Si_2O_5$ crystal, resulting in serious chipping and reduced transmittance during processing, which affects the aesthetic properties.

Combining the above examples, it can be seen that the fluorescent glass ceramic of the present disclosure does not include pentavalent/hexavalent metal oxides; by optimizing a composition ratio and optimizing a heat treatment process during the preparation process, the processability, high transparency, and fluorescence properties of the lithium metasilicate-based glass ceramic are greatly improved; and the ceramic has a transmittance of not less than 64.65% at a wavelength of 550 nm.

The present disclosure describes detailed products and methods through the above examples, but is not limited to the above detailed products and methods; that is, the above description does not mean that the present disclosure must rely on the above detailed products and methods to be implemented. Those skilled in the art should understand that any improvement and equivalent replacement to the present disclosure, addition of auxiliary ingredients, selection of specific ways and the like all fall within the scope of protection and disclosure of the present disclosure.

What is claimed is:

1. A fluorescent glass ceramic with transparency, comprising the following raw materials by mass percentage: 63 wt % to 70 wt % of $SiO_2$, 13 wt % to 16 wt % of $Li_2O$, 1 wt % to 6 wt % of $Al_2O_3$, 1 wt % to 10 wt % of $K_2O$, 2 wt % to 6 wt % of $P_2O_5$, 1.5 wt % to 3.0 wt % of $CeO_2$, 1 wt % to 4 wt % of an additive, 1.5 wt % to 3.0 wt % of a lanthanide oxide with an atomic number of 59 to 71, and 1 wt % to 4 wt % of a colorant, wherein the fluorescent glass ceramic has a lithium metasilicate crystal as a principal crystalline phase;

the lithium metasilicate crystal has a layered or plate-like structure;

the lithium metasilicate crystal has a grain size of 0.1 $\mu$m to 1.5 $\mu$m;

the additive comprising at least one selected from the group consisting of a monovalent metal oxide and a divalent metal oxide; and the raw materials for the fluorescent class ceramic do not comprise a pentavalent metal oxide and a hexavalent metal oxide.

2. The fluorescent glass ceramic of claim 1, comprising the following raw materials by mass percentage: 64 wt % to 66 wt % of the $SiO_2$, 14 wt % to 15 wt % of the $Li_2O$, 2 wt % to 4 wt % of the $Al_2O_3$, 2 wt % to 5 wt % of the $K_2O$, 3 wt % to 4 wt % of the $P_2O_5$, 1.5 wt % to 3.0 wt % of the $CeO_2$, 1 wt % to 3 wt % of the additive, 1.5 wt % to 3.0 wt % of the lanthanide oxide with the atomic number of 59 to 71, and 1 wt % to 4 wt % of the colorant.

3. The fluorescent glass ceramic of claim 1, wherein the monovalent metal oxide comprises at least one selected from the group consisting of $Na_2O$, $Rb_2O$, and $Cs_2O$; and the divalent metal oxide comprises at least one selected from the group consisting of MgO, SrO, ZnO, and CaO.

4. The fluorescent glass ceramic of claim 1, wherein the lanthanide oxide with the atomic number of 59 to 71 comprises at least one selected from the group consisting of $Nd_2O_3$, $Tb_2O_3$, $Pr_6O_{11}$, $Eu_2O_3$, and $Er_2O_3$.

5. The fluorescent glass ceramic of claim 2, wherein the lanthanide oxide with the atomic number of 59 to 71 comprises at least one selected from the group consisting of $Nd_2O_3$, $Tb_2O_3$, $Pr_6O_{11}$, $Eu_2O_3$, and $Er_2O_3$.

6. The fluorescent glass ceramic of claim 1, wherein the colorant comprises at least one selected from the group consisting of $TiO_2$, CuO, MnO, and $SeO_2$.

7. The fluorescent glass ceramic of claim 1, wherein a 1-mm-thick sample of the fluorescent glass ceramic has an optical transmittance of 40% to 90% at 550 nm.

8. A method for preparing the fluorescent glass ceramic of claim 1, comprising:

(1) mixing the raw materials of the fluorescent glass ceramic according to a proportion to obtain a mixture, and subjecting the mixture to primary melting and water quenching in sequence to obtain a glass slag;

(2) subjecting the glass slag obtained in step (1) to secondary melting and a forming annealing treatment in sequence to obtain a first glass matrix; or subjecting the glass slag obtained in step (1) to grinding, dry pressing, and vacuum sintering in sequence to obtain a second glass matrix; and (3) subjecting the first glass matrix or the second glass matrix obtained in step (2) to a first heat treatment and a second heat treatment in sequence to obtain the fluorescent glass ceramic with transparency.

9. The method of claim 8, wherein in step (1), the primary melting is conducted at a temperature of 1,300° C. to 1,600° C.; and in step (1), the primary melting is conducted for 1 h to 6 h.

10. The method of claim 8, wherein in step (2), the secondary melting is conducted at a temperature of 1,300° C. to 1,600° C.; and in step (2), the secondary melting is conducted for 1 h to 6 h.

11. The method of claim 8, wherein in step (2), the forming annealing treatment comprises: pouring a base glass liquid obtained after the secondary melting into a first mold preheated to a temperature of 200° C. to 500° C. and subjecting the base glass liquid to annealing.

12. The method of claim 8, wherein the forming annealing treatment is conducted for 0.5 h to 24 h; and the method further comprises cooling the first glass matrix to ambient temperature after the forming annealing treatment.

13. The method of claim 8, wherein in step (2), a glass powder with a particle size of 0.2 μm to 50 μm is obtained after the grinding.

14. The method of claim 8, wherein in step (2), the dry pressing comprises: subjecting a glass powder obtained after the grinding to dry pressing at a pressure of 5 MPa to 50 MPa in a second mold to obtain a biscuit.

15. The method of claim 8, wherein in step (2), the vacuum sintering is conducted at a vacuum degree of 100 Pa to 3,000 Pa;

in step (2), the vacuum sintering is conducted at a temperature of 900° C. to 1,200° C.; and in step (2), the vacuum sintering is conducted for 100 min to 240 min.

16. The method of claim 8, wherein in step (3), the first heat treatment is conducted at a temperature of 450° C. to 580° C.; and in step (3), the first heat treatment is conducted for 1 h to 48 h.

17. The method of claim 8, wherein in step (3), the second heat treatment is conducted at a temperature of 600° C. to 700° C.; and in step (3), the second heat treatment is conducted for 10 min to 240 min.

\* \* \* \* \*